US011330655B2

(12) United States Patent
Lee et al.

(10) Patent No.: US 11,330,655 B2
(45) Date of Patent: May 10, 2022

(54) USER TERMINAL INCLUDING PLURALITY OF SUBSCRIBER IDENTITY MODULES

(71) Applicant: SAMSUNG ELECTRONICS CO., LTD., Suwon-si (KR)

(72) Inventors: Sanghyun Lee, Suwon-si (KR); Jungmin Oh, Suwon-si (KR); Kyungwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/141,683

(22) Filed: Jan. 5, 2021

(65) Prior Publication Data
US 2021/0219362 A1 Jul. 15, 2021

(30) Foreign Application Priority Data
Jan. 9, 2020 (KR) .................. 10-2020-0002905

(51) Int. Cl.
*H04W 76/15* (2018.01)
*H04W 72/04* (2009.01)
(Continued)

(52) U.S. Cl.
CPC ......... *H04W 76/15* (2018.02); *H04L 41/0813* (2013.01); *H04W 24/08* (2013.01); *H04W 72/048* (2013.01); *H04W 88/06* (2013.01)

(58) Field of Classification Search
CPC . H04W 76/15; H04W 76/16; H04W 72/1215; H04W 48/10; H04W 48/16;
(Continued)

(56) References Cited

U.S. PATENT DOCUMENTS 9,215,753 B2* 12/2015 Josso ................. H04W 68/00
9,648,635 B2* 5/2017 Lee ................... H04W 72/1215
(Continued)

FOREIGN PATENT DOCUMENTS

EP        3340732           6/2018
WO    WO-2020045952 A1 *  3/2020  ............ H04W 8/183
WO    WO-2021141341 A1 *  7/2021  ......... H04L 41/0813

OTHER PUBLICATIONS

B. Hong et al., "Peeking Over the Cellular Walled Gardens—A Method for Closed Network Diagnosis—," in IEEE Transactions on Mobile Computing, vol. 17, No. 10, pp. 2366-2380, Oct. 1, 2018, doi: 10.1109/TMC.2018.2804913. (Year: 2018).*

(Continued)

*Primary Examiner* — William D Cumming
(74) *Attorney, Agent, or Firm* — Nixon & Vanderhye P.C.

(57) ABSTRACT

A user equipment (UE) may include a first subscriber identity module corresponding to a first cellular network, a second subscriber identity module corresponding to a second cellular network, a wireless communication circuit, and a processor. The processor may be is configured to: perform data communication with the first cellular network that supports EUTRA NR dual connectivity (EN-DC) using first identity information of the first subscriber identity module, via the wireless communication circuit; detect an activity that triggers data communication via the second cellular network; and in response to the detection of the activity, perform a process of connecting data communication with the second cellular network using second identify information of the second subscriber identity module via the wireless communication circuit, and maintain support of an EN-DC of a UE capability associated with the first cellular network.

15 Claims, 10 Drawing Sheets

(51) Int. Cl.
*H04W 24/08* (2009.01)
*H04L 41/0813* (2022.01)
*H04W 88/06* (2009.01)

(58) Field of Classification Search
CPC ... H04W 68/005; H04W 88/06; H04W 76/30; H04W 72/005; H04W 28/0284; H04W 68/00; H04W 36/14
USPC .............................................. 455/435.2, 437
See application file for complete search history.

(56) References Cited

U.S. PATENT DOCUMENTS

| | | | |
|---|---|---|---|
| 9,775,082 | B1 | 9/2017 | Chakraborty et al. |
| 9,826,570 | B1* | 11/2017 | Gupta ................. H04L 65/1073 |
| 9,848,354 | B2* | 12/2017 | Rajaee .............. H04W 28/0284 |
| 10,383,143 | B2* | 8/2019 | Keshav ................. H04W 88/06 |
| 10,911,995 | B2* | 2/2021 | Tsai .................. H04W 36/0069 |
| 11,013,054 | B2* | 5/2021 | Yi ......................... H04W 76/27 |
| 11,096,036 | B2* | 8/2021 | Poornachandran ......................... G01C 21/3461 |
| 2014/0106747 | A1* | 4/2014 | Josso .................... H04W 36/14 455/435.2 |
| 2014/0220981 | A1* | 8/2014 | Jheng .................... H04W 76/30 455/437 |
| 2016/0374108 | A1* | 12/2016 | Lee ...................... H04W 72/005 |
| 2017/0086094 | A1* | 3/2017 | Rajaee .............. H04W 28/0284 |
| 2017/0353893 | A1 | 12/2017 | Marwah et al. |
| 2018/0041953 | A1 | 2/2018 | Lindoff et al. |
| 2018/0132289 | A1* | 5/2018 | Zhao ..................... H04W 76/16 |
| 2018/0160422 | A1 | 6/2018 | Pathak et al. |
| 2018/0255567 | A1* | 9/2018 | Keshav ................ H04W 76/14 |
| 2018/0368099 | A1 | 12/2018 | Chen et al. |
| 2019/0110236 | A1 | 4/2019 | Huang et al. |
| 2019/0364492 | A1* | 11/2019 | Azizi .................. H04W 68/005 |
| 2020/0008044 | A1* | 1/2020 | Poornachandran ... H04W 16/18 |
| 2020/0205062 | A1* | 6/2020 | Azizi ................... H04W 48/10 |
| 2020/0296638 | A1* | 9/2020 | Tsai ..................... H04W 36/28 |
| 2020/0329523 | A1* | 10/2020 | Yi ....................... H04W 72/048 |
| 2021/0014667 | A1* | 1/2021 | Lovlekar ........... H04W 52/0216 |
| 2021/0099848 | A1* | 4/2021 | Ruan ....................... H04W 4/40 |
| 2021/0112399 | A1* | 4/2021 | Gopal ................... H04W 24/08 |
| 2021/0120524 | A1* | 4/2021 | Palle .................. H04W 60/005 |
| 2021/0135727 | A1* | 5/2021 | Balasubramanian ........................ H04W 28/06 |
| 2021/0167903 | A1* | 6/2021 | Venkatachari ........ H04W 72/14 |
| 2021/0195670 | A1* | 6/2021 | Ozturk ................... H04W 8/24 |
| 2021/0219362 | A1* | 7/2021 | Lee ....................... H04W 76/15 |
| 2021/0227376 | A1* | 7/2021 | Jha ........................ H04M 1/725 |

OTHER PUBLICATIONS

I. Abdalla and S. Venkatesan, "Scalable addressing of M2M terminals in 4G cellular wireless networks," 2013 Wireless Telecommunications Symposium (WTS), Jul. 2013, pp. 1-6, doi: 10.1109/WTS.2013.6566239. (Year: 2013).*
International Search Report dated Apr. 15, 2021 in corresponding International Application No. PCT/KR2021/000044.

* cited by examiner

USER TERMINAL INCLUDING PLURALITY OF SUBSCRIBER IDENTITY MODULES

CROSS-REFERENCE TO RELATED APPLICATION

This application is based on and claims priority under 35 U.S.C. § 119 to Korean Patent Application No. 10-2020-0002905, filed on Jan. 9, 2020, in the Korean Intellectual Property Office, the disclosure of which is incorporated by reference herein in its entirety.

BACKGROUND

Field

The disclosure relates to a user equipment (UE), and for example, to a UE that includes two or more subscriber identity modules (SIMs), and supports EUTRA NR dual connectivity (EN-DC).

Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have also been developed.

A subscriber identity module (SIM) may be an IC card that stores subscriber information of a user equipment (UE) which is used for wireless network communication. The UE may include a single SIM, and the UE may include two or more SIMs so as to access a wireless network using a plurality of pieces of identity information using respective SIMs.

A user equipment (UE) that supports EUTRA NR dual connectivity (EN-DC) may also include two or more SIMs. In this instance, the UE may perform an unnecessary EN-DC operation for a SIM stack that is not used for data communication, which may increase the complexity in implementation and the amount of current consumed.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a UE and a method performed by the UE, wherein the UE includes two or more SIMs, and is designed to not perform an unnecessary EN-DC operation for a SIM stack that is not used for data communication, and decreases the complexity in implementing software and the amount of current consumed.

In accordance with an example embodiment of the disclosure, a user equipment (UE) may include: a first subscriber identity module corresponding to a first cellular network; a second subscriber identity module corresponding to a second cellular network; a wireless communication circuit; and a processor operatively connected to the first subscriber identity module, the second subscriber identity module, and the wireless communication circuit, wherein the processor is configured to: control the UE to perform data communication with the first cellular network that supports EUTRA NR dual connectivity (EN-DC) using first identity information of the first subscriber identity module, via the wireless communication circuit; detect an activity that triggers data communication via the second cellular network; and in response to the detection of the activity, perform a process of connecting data communication with the second cellular network using second identity information of the second subscriber identity module via the wireless communication circuit, and maintain support of an EN-DC of a UE capability associated with the first cellular network.

In accordance with an example embodiment of the disclosure, a method performed by a UE may include: performing data communication with a first cellular network that supports EUTRA NR dual connectivity (EN-DC) using first identity information of a first subscriber identity module; detecting an activity that triggers data communication via a second cellular network; and in response to the detection of the activity, performing a process of detecting data communication with the second cellular network using second identity information of a second subscriber identity module, and maintaining support of the EN-DC of a UE capability associated with the first cellular network.

According to various example embodiments, a UE and a method performed by the UE is provided, the UE includes two or more SIMs, and is designed to not perform an unnecessary EN-DC operation for a SIM stack that is not used for data communication, and decreases the complexity in implementing software and the amount of current consumed.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
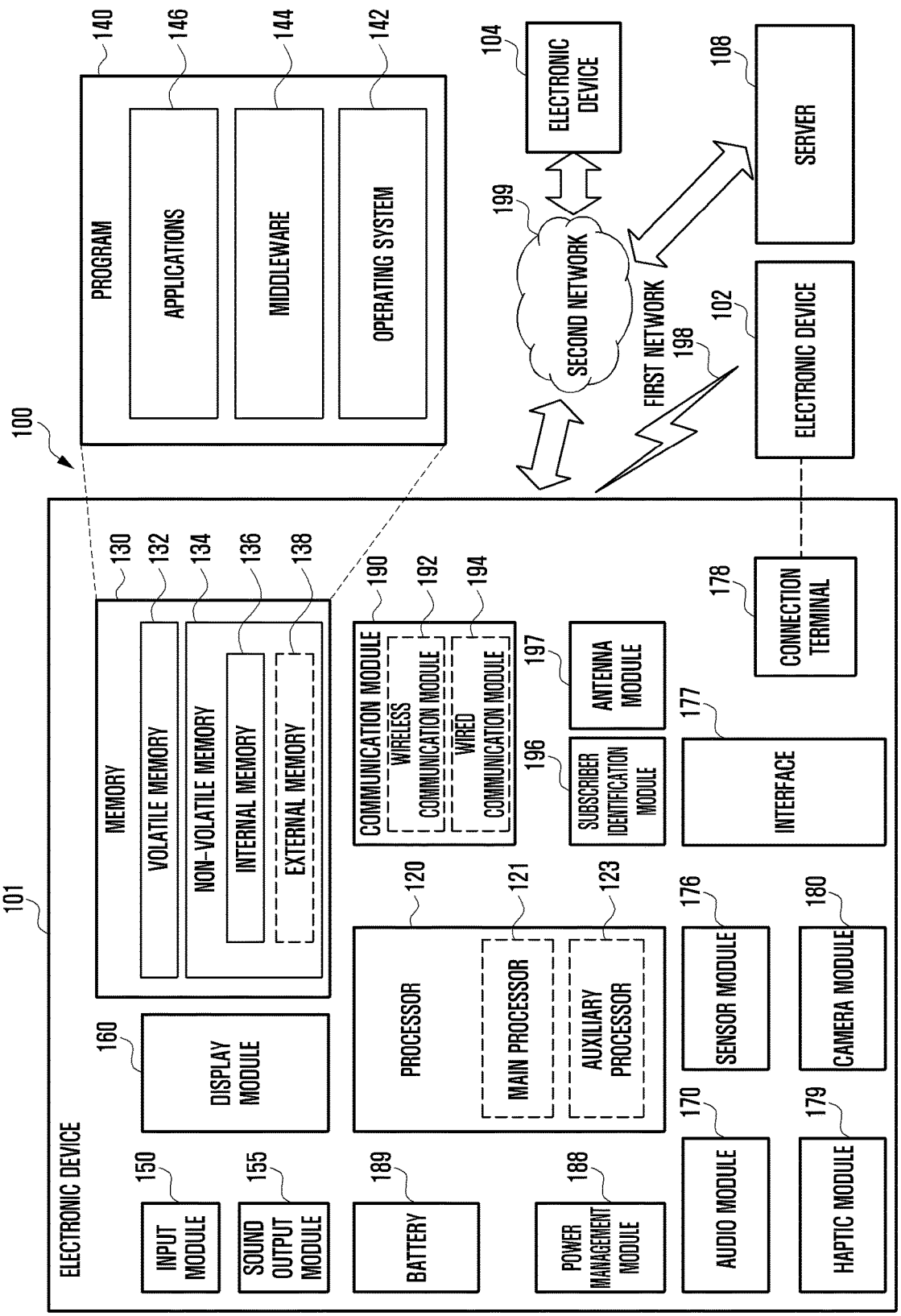
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
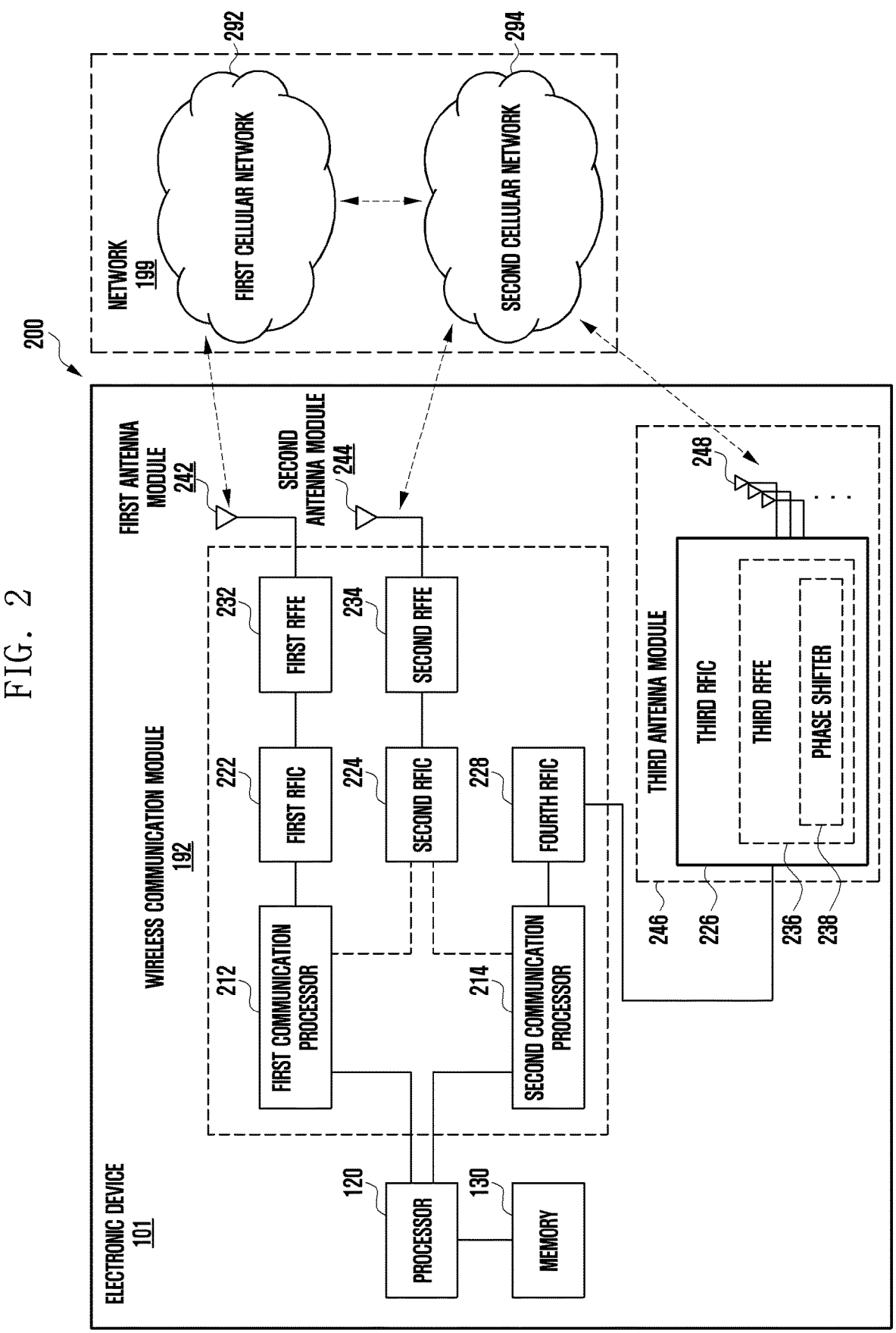
FIG. 2 is a block diagram illustrating an example electronic device for supporting legacy network communication and 5G network communication according to various embodiments.

FIG. 2 is a block diagram illustrating an example electronic device for supporting legacy network communication and 5G network communication according to various embodiments.

Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor (e.g., including processing circuitry) 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the radio communication module 192. According to an embodiment, the fourth RFIC 228 may be omitted, or may be included as a part of the third RFIC 226.

The first communication processor 212 may establish a communication channel of a band to be used for wireless communication with the first network 292, and may support network communication via the established communication channel. According to various embodiments, the first network may be a legacy network including a $2^{nd}$ generation (2G), $3^{rd}$ generation (3G), $4^{th}$ generation (4G), or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel. According to various embodiments, the second network 294 may be a 5G network defined in 3GPP. Additionally, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established channel. According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal produced by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal produced by the first communication processor 212 or the second communication processor 214 into an RF signal (hereinafter, a 5G Sub6 RF signal) of an Sub6 band (e.g., approximately 6 GHz or less) used for the second network 294 (e.g., 5G network). In the case of reception, a 5G Sub6 RF signal is obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor from among the first communication processor 212 or the second communication processor 214.

The third RFIC 226 may convert a baseband signal produced by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is received from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFFE 226. The fourth RFIC 228 may convert the IF signal into a baseband signal so that the baseband signal is processed by the second communication processor 214.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted, or may be combined with another antenna module, so as to process RF signals in a plurality of bands.

According to an embodiment, the third RFIC 226 and the antenna 248 may be disposed on the same substrate, and may form a third antenna module 246. For example, the wireless communication module 192 or the processor 120 may be disposed in a first substrate (e.g., main PCB). In this instance, the third RFIC 226 is disposed on a part (e.g., a lower part) of a second substrate (e.g., a sub PCB) different from the first substrate, and the antenna 248 is disposed on another part (e.g., an upper part), so that the third antenna module 246 may be formed. By disposing the third RFIC 226 and the antenna 248 on the same substrate, the length of a transmission line therebetween may be reduced. For example, this may reduce a loss (e.g., attenuation) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., a 5G radio access network (RAN) or next generation RAN (NG RAN)) may be present, and a core network (e.g., a next generation core (NGC)) may not be present. In this instance, the electronic device 101 may access the access network of the 5G network, and may access an external network (e.g., the Internet) under the control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3:
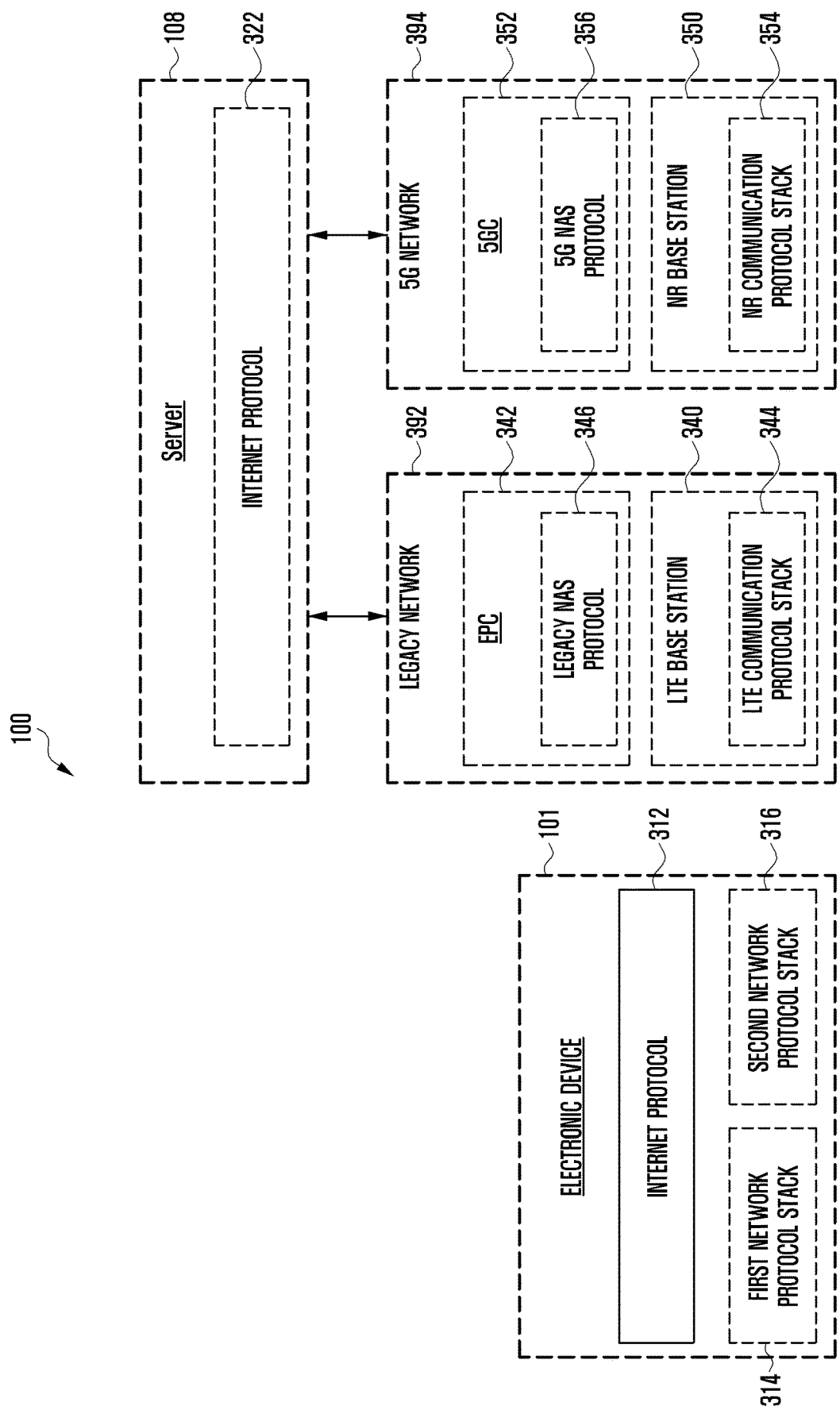
FIG. 3 is a diagram illustrating an example protocol stack structure of a network of legacy communication and/or 5G communication according to various embodiments.

FIG. 3 is a diagram illustrating an example protocol stack structure of a network of legacy communication and/or 5G communication according to various embodiments.

Referring to FIG. 3, the network 100 according to an embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 via the legacy network 392 and/or 5G network 394.

According to an embodiment, the electronic device 101 may perform Internet communication associated with the server 108 using the Internet protocol 312 (e.g., TCP, UDP, or IP). The Internet protocol 312 may be performed by, for example, a main processor (e.g., the main processor 121 of FIG. 1) included in the electronic device 101.

According to an embodiment, the electronic device 101 may perform wireless communication with the legacy network 392 using the first communication protocol stack 314. According to an embodiment, the electronic device 101 may perform wireless communication with the 5G network 394 using the second communication protocol stack 316. The first communication protocol stack 314 and the second communication protocol stack 316, for example, may be performed by one or more communication processors (e.g., the wireless communication module 192 of FIG. 1) included in the electronic device 101.

The server 108 may include an Internet protocol 322. The server 108 may perform transmission or reception of data related to the Internet protocol 322 with the electronic device 101 via the legacy network 392 and/or 5G network 394. According to an embodiment, the server 108 may include a cloud computing server existing outside the legacy network 392 or the 5G network 394. According to an embodiment, the server 108 may include an edge computing server (or a mobile edge computing (MEC) server) located inside at least one of the legacy network 392 or the 5G network 394.

The legacy network 392 may include an LTE base station 340 and an EPC 342. The LTE base station 340 may include an LTE communication protocol stack 344. The EPC 342 may include a legacy NAS protocol 346. The legacy network 392 may perform LTE wireless communication with the electronic device 101 using the LTE communication protocol stack 344 and a legacy NAS protocol 346.

The 5G network 394 may include an NR base station 350 and a 5GC 352. The NR base station 350 may include an NR communication protocol stack 354. The 5GC 352 may include a 5G NAS protocol 356. The 5G network 394 may perform NR wireless communication with the electronic device 101 using the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting or receiving control messages, and a user plane protocol for transmitting or receiving user data. A control message may include, for example, a message related to at least one of security control, bearer setup, authentication, registration, or mobility management. User data may include, for example, the remaining data, excluding a control message.

According to an embodiment, the control plane protocol and the user plane protocol may include a physical (PHY) layer, a medium access control (MAC) layer, a radio link control (RLC) layer, or a packet data convergence protocol (PDCP) layer. For example, the PHY layer may perform channel coding and modulation of data received from a higher layer (e.g., the MAC layer), and transmit the same to a wireless channel, and may perform demodulation and decoding of data received via a wireless channel and transmit the same to a higher layer. The PHY layer included in the second communication protocol stack 316 and the NR communication protocol stack 354 may further perform an operation related to beamforming. The MAC layer may, for example, logically/physically map data to a wireless channel to be transmitted or received, and may perform hybrid automatic repeat request (HARD) for error correction. The RLC layer may perform concatenation, segmentation, or reassembly of data, may identify the order of data, may perform reordering, and may perform redundancy check. The PDCP layer may perform, for example, an operation of ciphering control data and user data, and an operation related to data integrity. The second communication protocol stack 316 and the NR communication protocol stack 354 may further include a service data adaptation protocol (SDAP). The SDAP may manage, for example, wireless bearer allocation based on the quality of service (QoS) of user data.

According to various embodiments, the control plane protocol may include a radio resource control (RRC) layer and a non-access stratum (NAS) layer. The RRC layer may process, for example, control data related to radio bearer setup, paging, or mobility management. The NAS may process, for example, a control message related to authentication, registration, and mobility management.

According to various embodiments, the electronic device may include a plurality of subscriber identity modules (e.g., a first subscriber identity module and a second subscriber identity module), and may communicate with the legacy network 392 and/or 5G network 394 using subscriber information (e.g., international mobile subscriber identification (IMSI)) stored in each subscriber identity module.

According to various embodiments, the electronic device may further include a third communication protocol stack 318 and a fourth communication protocol stack 319. The third communication protocol stack 318 may correspond to the first communication protocol stack 314, and may include various protocols for wireless communication with the legacy network 392. The fourth communication protocol stack 319 may correspond to the second communication protocol stack 316, and may include various protocols for wireless communication with the 5G network 394.

According to various embodiments, when performing communication using a first subscriber identity module, the electronic device may perform wireless communication with the legacy network 392 using the first communication protocol stack 314, and may perform wireless communication with the 5G network 394 using the second communication protocol stack 316. Also, when performing communication using a second subscriber identity module, the electronic device may perform wireless communication with the legacy network 392 using the third communication protocol stack 318, and may perform wireless communication with the 5G network 394 using the fourth communication protocol stack 319.

Figure 4A:
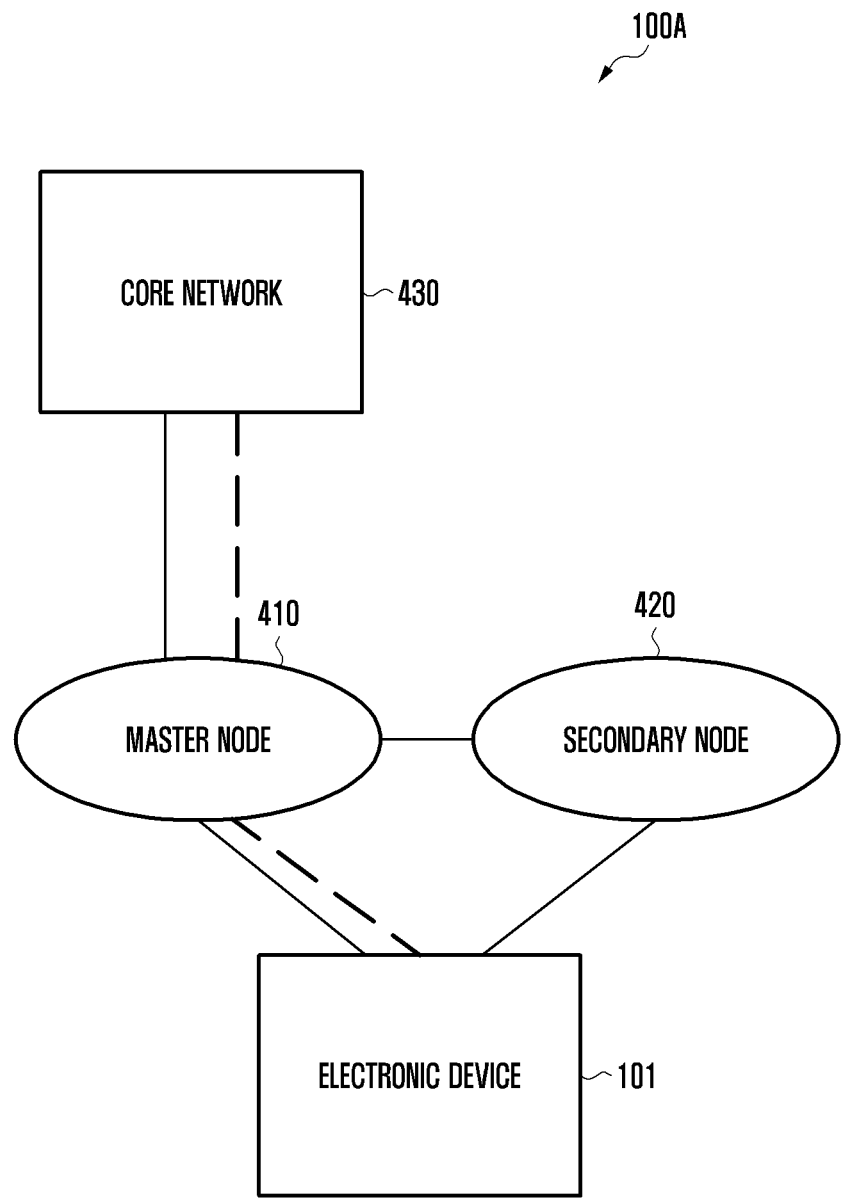
FIG. 4A is a diagram illustrating an example wireless communication system that provides a legacy communication network and/or a 5G communication network according to various embodiments.
Figure 4B:
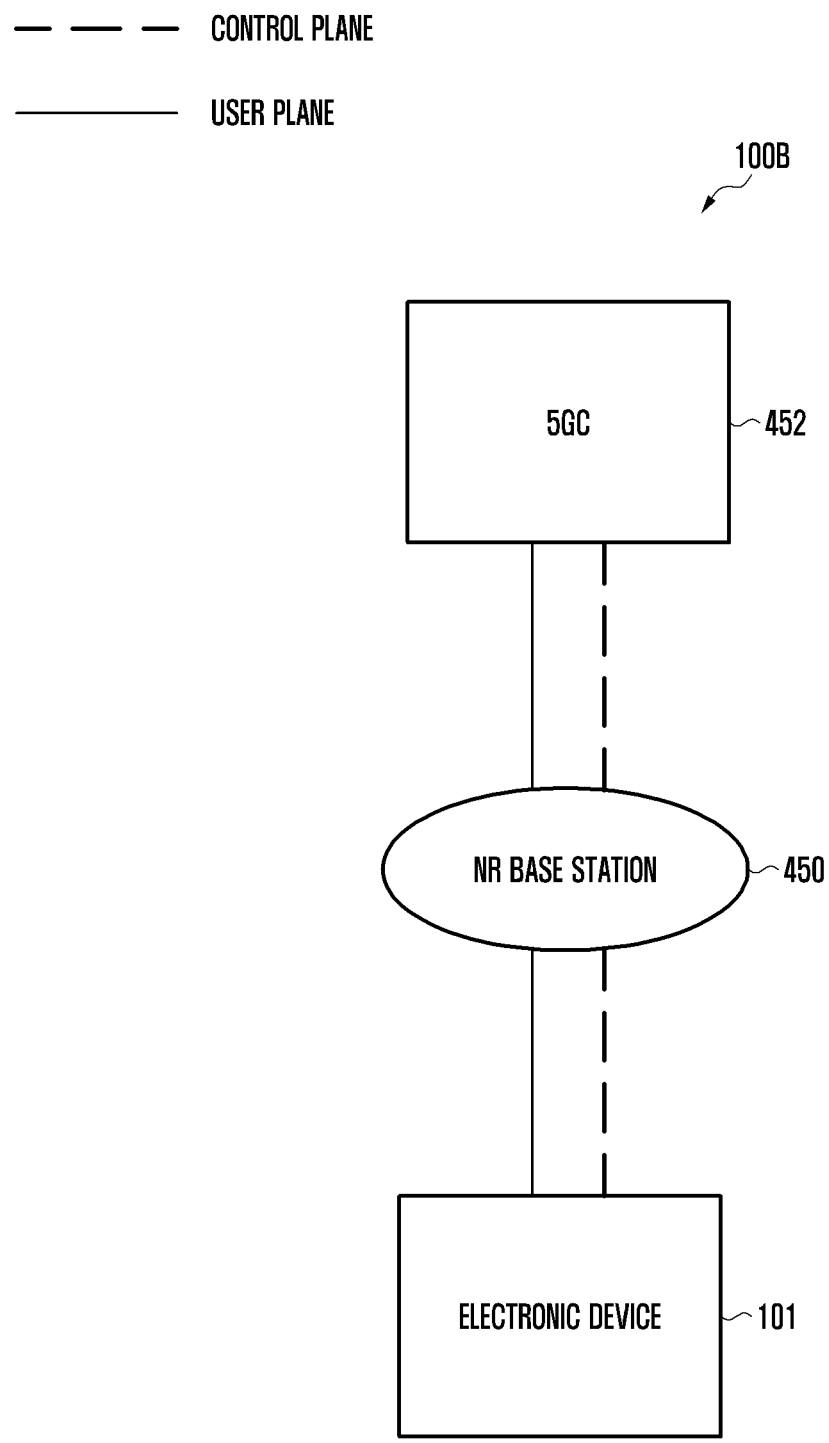
FIG. 4B is a diagram illustrating an example wireless communication system that provides a legacy communication network and/or a 5G communication network according to various embodiments.
Figure 4C:
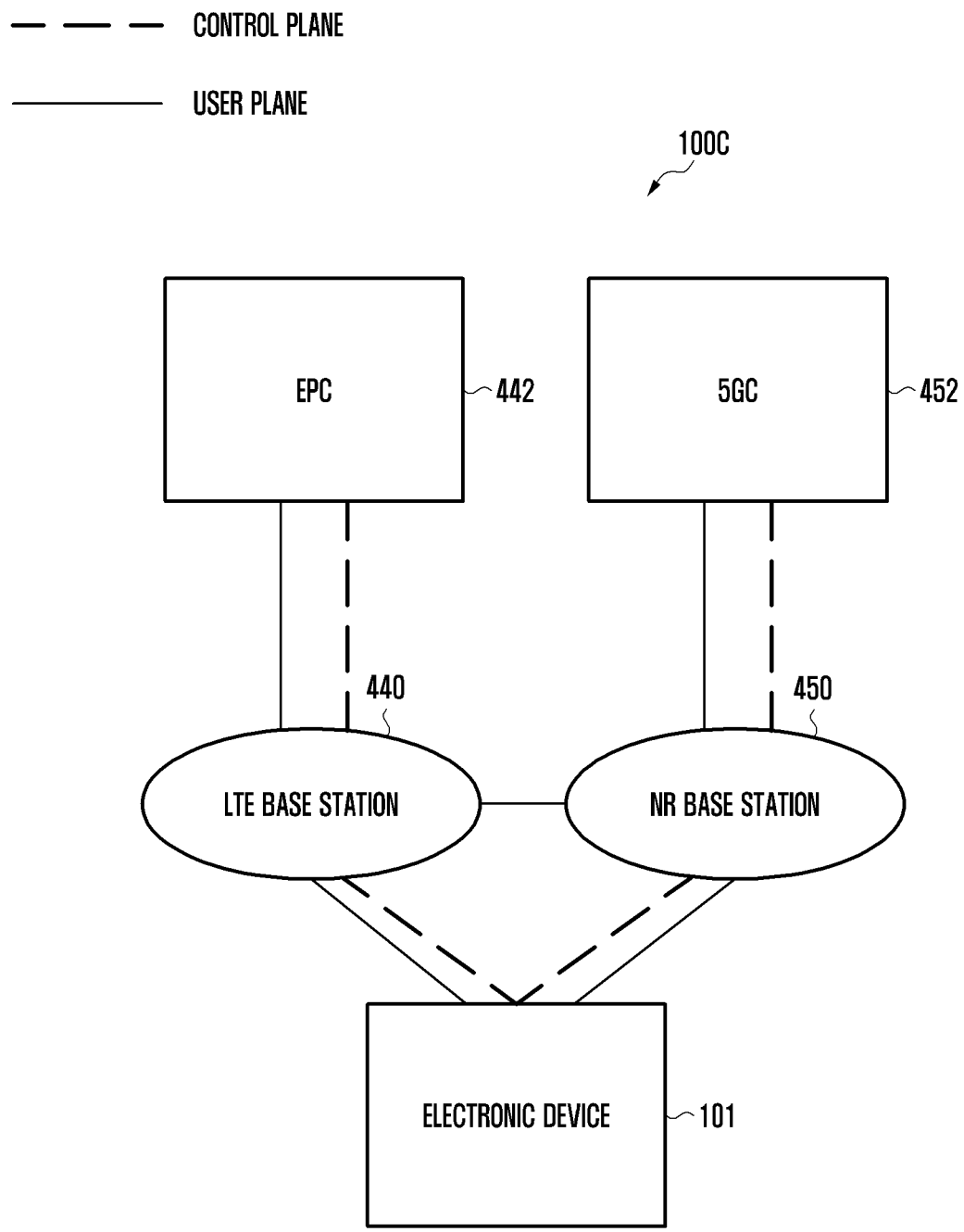
FIG. 4C is a diagram illustrating an example wireless communication system that provides a legacy communication network and/or a 5G communication network according to various embodiments.

FIG. 4A is a diagram illustrating an example wireless communication system that provides a legacy communication network and/or a 5G communication network according to various embodiments, FIG. 4B is a diagram illustrating an example wireless communication system that provides a legacy communication network and/or a 5G communication network according to various embodiments, and FIG. 4C is a diagram illustrating an example wireless communication system that provides a legacy communication network and/or a 5G communication network according to various embodiments.

Referring to FIGS. 4A, 4B and 4C, a network environment 100A, 100B and 100C may include at least one of a legacy network and a 5G network. The legacy network, for example, may include a 3GPP standard-based 4G or LTE base station 440 (e.g., eNodeB (eNB)) that supports radio access to the electronic device 101, and an evolved packet core (EPC) 442 that manages 4G communication. The 5G network, for example, may include a new radio (NR) base station (e.g., a gNodeB (gNB)) 450 that supports radio access to the electronic device 101 and a 5$^{th}$ generation core (5GC) 452 that manages 5G communication of the electronic device 101.

According to various embodiments, the electronic device 101 may transmit or receive a control message and user data via legacy communication and/or 5G communication. The control message, for example, may include a message related to at least one of security control, bearer setup, authentication, registration, or mobility management in association with the electronic device 101. The user data, for example, may be user data, excluding a control message transmitted or received between the electronic device 101 and the core network 430 (e.g., the EPC 442 of FIG. 4C).

Referring to FIG. 4A, the electronic device 101 according to an embodiment may perform transmission or reception of at least one of a control message or user data with at least a part of the 5G network (e.g., the NR base station 450 or the 5GC 452 of FIG. 4C), using at least a part of the legacy network (e.g., an LTE base station 440 or the EPC 442 of FIG. 4C).

According to various embodiments, the network environment 100a may include a network environment that provides a wireless communication dual connectivity (multi-RAT (radio access technology) dual connectivity (MR-DC)) to the LTE base station 440 and the NR base station 450, and performs transmission or reception of a control message with the electronic device 101 via the core network 430 corresponding to one of the EPC 442 or 5GC 452.

According to various embodiments, in the MR-DC environment, one of the LTE base station 440 or the NR base station 450 may operate as a master node (MN) 410, and the other may operate as a secondary node (SN) 420. The MN 410 may be connected to the core network 430, and may transmit or receive a control message. The MN 410 and the SN 420 are connected via a network interface, and may perform transmission or reception of a message related to management of radio resources (e.g., a communication channel) therebetween.

According to various embodiments, the MN 410 may be implemented as the LTE base station 440, the SN 420 may be implemented as the NR base station 450, and the core network 430 may be implemented as the EPC 442. For example, a control message may be transmitted or received via the LTE base station 440 and the EPC 442, and user data may be transmitted or received via the LTE base station 440 and the NR base station 450.

Referring to FIG. 4B, according to various embodiments, the 5G network may independently perform transmission or reception of a control message and user data with the electronic device 101.

Referring to FIG. 4C, the legacy network and the 5G network according to various embodiments may independently provide data transmission or reception. For example, the electronic device 101 and the EPC 442 may perform transmission or reception of a control message and user data via the LTE base station 440. As another example, the electronic device 101 and the 5GC 452 may perform transmission or reception of a control message and user data via the NR base station 450.

According to various embodiments, the electronic device 101 may be registered with at least one of the EPC 442 or 5GC 452, and may transmit or receive a control message.

According to various embodiments, the EPC 442 or 5GC 452 may interwork, so as to manage communication of the electronic device 101. For example, the movement information of the electronic device 101 may be transmitted or received via an interface between the EPC 442 and the 5GC 452.

Figure 5:
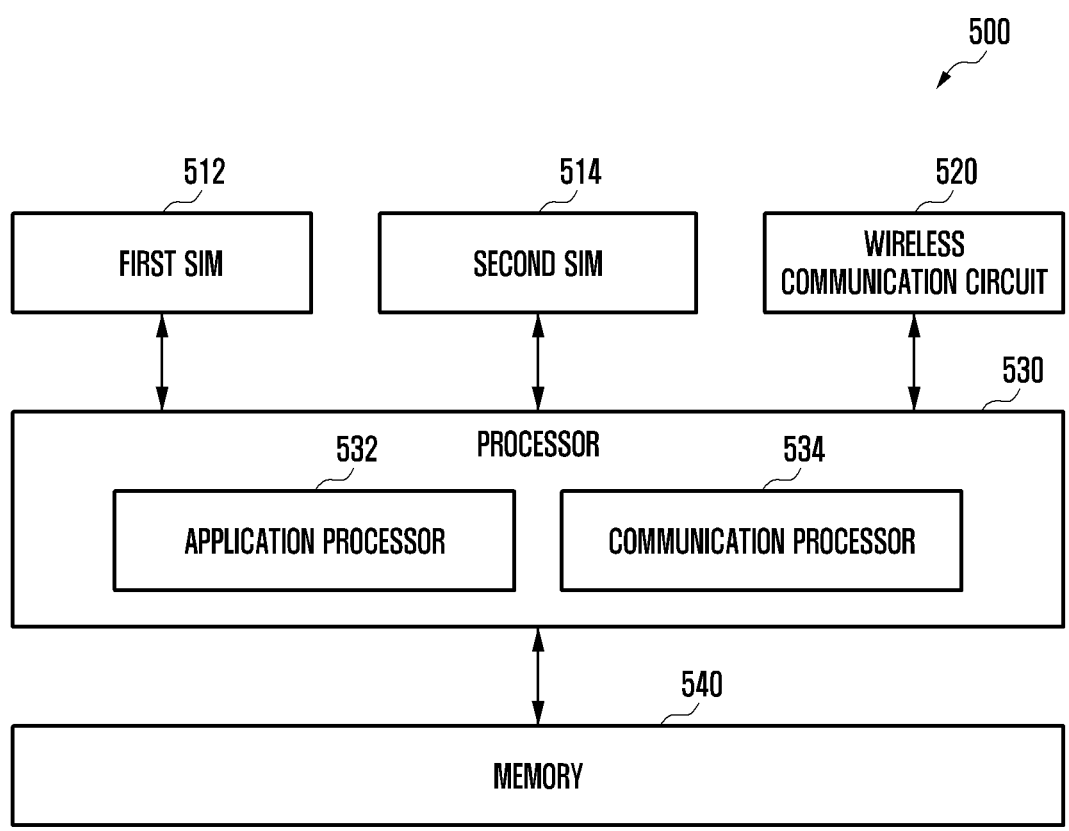
FIG. 5 is a block diagram illustrating example user equipment (UE) according to various embodiments.

FIG. 5 is a block diagram illustrating an example configuration of user equipment (UE) according to various embodiments.

Referring to FIG. 5, a user equipment (UE) 500 may include a first subscriber identity module 512, a second subscriber identity module 514, a wireless communication circuit 520, a processor (e.g., including processing circuitry) 530, and a memory 540. The UE 500 according to various embodiments may include at least a part of the elements and/or functions of the electronic device 101 of FIG. 1, and may be capable of implementing various embodiments of the disclosure although some of the elements of FIG. 1 or FIG. 5 may be omitted or replaced.

According to various embodiments, the wireless communication circuit 520 may include various circuit structures used for modulating and/or demodulating a signal in the UE 500. For example, the wireless communication circuit 520 may modulate a baseband signal into a radio frequency (RF) band signal so that the signal is output via an antenna (not illustrated), or may demodulate an RF band signal received via an antenna into a baseband signal and transmit the same to the processor 530. The wireless communication circuit 520 may include various RFICs (e.g., the first RFIC 222, the second RFIC 224, the third RFIC 236, and the fourth RFIC 228 of FIG. 2) and/or RF front end modules (e.g., first RFFE 232, the second RFFE 234, and the third RFFE 236 of FIG. 2). The elements of the wireless communication circuit 520 may be all included in the same chip or some of them may be included in different chips.

According to various embodiments, the memory 540 may include a volatile memory (e.g., the volatile memory 132 of FIG. 1) and a non-volatile memory (e.g., the non-volatile memory 134 of FIG. 1). According to various embodiments, the memory 540 may store various instructions executable by the processor 530 (e.g., application processor 530). The memory 540 may store the program 140 of FIG. 1.

According to various embodiments, the processor 530 may include various processing circuitry including an application processor (e.g., including processing circuitry) 532 and a communication processor (e.g., including processing circuitry) 534. Operations performed by the processor 530 described in the disclosure may be performed by the application processor 532, or may be performed by the communication processor 534. Some of the operations may be performed by the application processor 532 and the communication processor 534, respectively. The application processor 532 and the communication processor 534 may be included in the same chip, or one of them may be included in another chip. The processor 530 may be functionally, operatively and/or electrically connected to the internal elements of the UE 500 including the first subscriber identity module 512, the second subscriber identity module 514, the wireless communication circuit 520, and the memory 540.

According to various embodiments, the application processor 530 may include at least a part of the elements and/or functions of the main processor 121 of FIG. 1 as an element capable of performing an operation and data processing associated with controlling and/or communication of each element of the UE 500. Operations performed by the application processor 532 may be performed by loading instructions stored in the memory 540.

According to various embodiments, the communication processor 534 may perform various operations for wireless communication on a cellular network. For example, the communication processor 530 may establish a communication channel of a band to be used for wireless communication with the cellular network, and may support wireless communication via the established communication channel.

According to various embodiments, subscriber identity modules (SIMs) 512 and 514 may store identification information (international mobile subscriber identity (IMSI)) for access, authentication, charging, security, and the like in the cellular network. The UE 500 may identify identification information stored in the SIMs 512 and 514 and may transmit the identity information to a base station during a cellular network access process (e.g., RRC signaling).

According to various embodiments, the SIMs 512 and 514 may be implemented as IC cards, and may be mounted in a slot prepared in the UE 500. According to various embodiments, at least one of the SIMs 512 and 514 may be implemented as an embedded-SIM (or embedded universal integrated circuit card (eUICC)) which is directly embedded in the UE 500. In the case in which the SIM 512 or 514 is implemented as an embedded-SIM, a secure chip for storing the SIM 512 or 514 is soldered on a circuit board of a UE during a manufacturing process, and is mounted in the UE via remote SIM provisioning.

According to various embodiments, the UE 500 may include two or more SIMs. Although the disclosure describes that the UE 500 includes two SIMs (e.g., the first SIM 512 and the second SIM 514), the disclosure is not limited thereto.

According to various embodiments, the UE 500 may perform wireless communication with a first cellular network (e.g., a first LTE network and/or a first NR network) and a second cellular network (e.g., a second LTE network and/or a second NR network) operated by different operators (or mobile carriers), using the first SIM 512 and the second SIM 514, respectively. For example, the UE 500 may wirelessly access a base station of the first cellular network using first identity information stored in the first SIM 512 when accessing the first cellular network, and may wirelessly access a base station of the second cellular network using second identity information stored in the second SIM 514 when accessing the second cellular network.

According to various embodiments, the first cellular network and/or second cellular network may support an EN-DC. The EUTRA NR dual connectivity (EN-DC) or non-standalone (NSA) system may provide uplink and/or downlink transmission using two radio access technologies (RATs), and, for example, the UE 500 of the EN-DC system may simultaneously use the resources of a 4G LTE cellular network and a 5G NR cellular network. To this end, the first cellular network may include a first LTE network and a first NR network, and the second cellular network may include a second LTE network and a second NR network. According to various embodiments, the communication processor 530 may include the first communication processor 530 which performs processing for wireless communication on an LTE network, and the second communication processor 530 which performs processing for wireless communication on an NR network.

According to various embodiments, the processor 530 may access the first cellular network and the second cellular network at the same time using the first SIM 512 and the second SIM 514. However, in this instance, the processor 530 may be capable of performing data communication associated with only one cellular network. For example, the UE 500 may obtain an internet protocol (IP) address allocated from an IP multimedia subsystem (IMS) for voice communication, and an IP address allocated for data communication. In this instance, the UE 500 may receive all IP addresses for the IMS in association with both of the first cellular network and the second cellular network, and may receive voice communication services on the first cellular network and the second cellular network using both the first identify information and the second identity information. In the case of data communication of Internet data, the UE 500 may receive an IP address for one of the first cellular network or the second cellular network, and may receive data communication via only one network. This will be described in detail with reference to FIG. 6.

According to various embodiments, the UE 500 may determine, based on a user selection, one of the first SIM 512 and the second SIM 514 to be a SIM to be used for data communication. For example, if the first SIM 512 is selected by a user selection, data communication and IMS communication may be performed with the first cellular network using the first identity information of the first SIM 512, and only IMS communication may be performed with the second cellular network using the second identity information of the second SIM 514.

According to various embodiments, the UE 500 may change a SIM to be used for data communication. For example, while performing data communication using the first SIM 512, the processor 530 may detect an activity that triggers data communication via the second cellular network. Here, a user setting or the case in which the communication with the second cellular network is temporarily changed to use data communication may be an example of the activity. For example, a user may change settings on a menu so as to change a SIM to the second SIM 514, while performing Internet data communication with the first cellular network. If an application is used that temporarily changes an Internet data setting in the second SIM 514 that only uses IMS, such as a multimedia message service (MMS), a connection for data communication with the second cellular network may be established temporarily using second identity information.

As described above, if a SIM to be used for Internet data communication is changed, a UE capability which is reported to the cellular network is changed, and an operation for registration with the cellular network may frequently occur. Accordingly, performance of the UE 500 may become slow, and the number of messages exchanged between the UE 500 and the cellular network may be increased.

According to various embodiments, in response to detection of the activity that triggers data communication via the second cellular network, the processor 530 may perform a data communication connection process with the second cellular network using the second identity information of the second SIM 514. The processor 530 may disconnect an EPS bearer which has been connected to the first cellular network via a PDN disconnect procedure, and may delete IP address information or the like related thereto. In addition, the processor 530 may connect an EPS bearer to the second cellular network via a PDN connectivity procedure using the second identity information, and may obtain an IP address to be used for data communication.

According to various embodiments, in the PDN disconnect procedure performed with respect to the first cellular network, the connection with the IMS may be maintained. For example, in the PDN disconnect procedure performed with respect to the first cellular network, the processor 530 may transmit a request for release of an EPS bearer and an IP address used for data communication with the first cellular network (e.g., a base station of the first LTE network). In this instance, the connection to the IMS may be maintained as an RRC connected state, or may be disconnected and RRS signaling for a new IMS may be performed.

According to various embodiments, even though a SIM stack to be used for data communication is changed to the second SIM 514, the processor 530 may maintain support of an EN-DC of a UE capability for the first cellular network. For example, although the EN-DC is not used for data communication in the first cellular network, the processor 530 may maintain an RRC signaling process or support of an EN-DC of a UE capability periodically transmitted to the first cellular network (e.g., a first LTE base station).

According to various embodiments, the processor 530 may be configured to not perform a measurement operation with respect to the first NR network (e.g., a base station of the first NR network) of the first cellular network if a measurement configuration is received from the first cellular network, while the processor 530 maintains support of EN-DC of a UE capability for the first cellular network.

For example, an MME connected to the first cellular network may identify that supporting an EN-DC is included in a UE capability transmitted from the UE 500, and, based on that subscriber information transferred from a home subscriber service (HSS), may identify that the UE 500 is a 5G service subscriber. The MME may transfer, to a base station of the first LTE network, that the UE 500 is capable of performing EN-DC connection. The base station of the first LTE network may transmit a measurement configuration to the UE 500 to enable the UE 500 to measure and report an NR access performance of a base station of the first NR network that is to act as a secondary node.

In this instance, the processor 530 may not perform a measurement operation with respect to the base station of the first NR network even through the measurement configuration is received. For example, the processor 530 may not perform a series of operations, such as measuring a serving signal of the first NR network base station in a frequency band defined in the measurement configuration, and transmitting a measurement report.

According to various embodiments, the processor 530 may be configured to return, to the first cellular network, a failure of cell addition or handover if a determination of cell addition or handover associated with the first NR network of the first cellular network is received from the first cellular network, while the processor 530 maintains support of the EN-DC of the UE capability for the first cellular network.

If the UE 500 receives a measurement configuration form the cellular network, the UE 500 may measure a serving signal of an adjacent cell according to a measurement result, and may transmit a measurement report to a base station. In this instance, an LTE event type is defined in the measurement report, and examples of the LTE event type may be events A1 to A6 or events B1 to B2. Event B1 may be the case in which a signal of an NR cell currently connected becomes higher than a predetermined value. If event B1 is provided as a measurement report, an LTE base station may request addition of, or handover to, a corresponding NR cell. Although event B1 is not provided as a measurement report, if a wireless environment of a currently connected cell is poor even when another adjacent cell is not identified in a handover situation, the LTE base station may request addition of, or handover to, an NR cell.

As described above, the processor 530 may not perform a measurement operation with respect to the first NR network in the state in which the processor 530 maintains support of the EN-DC of the UE capability for the first cellular network. However, when a wireless environment is poor or the like, the first LTE base station may request addition of, or handover to, the first NR network even though an event B1 measurement report is not provided. In this instance, the processor 530 may process the addition or handover request of the first LTE base station to be "failure", and return "failure" in response to the addition or handover request, so as not to initiate an access (attach) process with respect to the first NR network. Accordingly, even when the first cellular network supports EN-DC, and the UE capability continuously reports EN-DC support, the UE 500 may not initiate connection to the first NR base station of the first cellular network.

Figure 6:
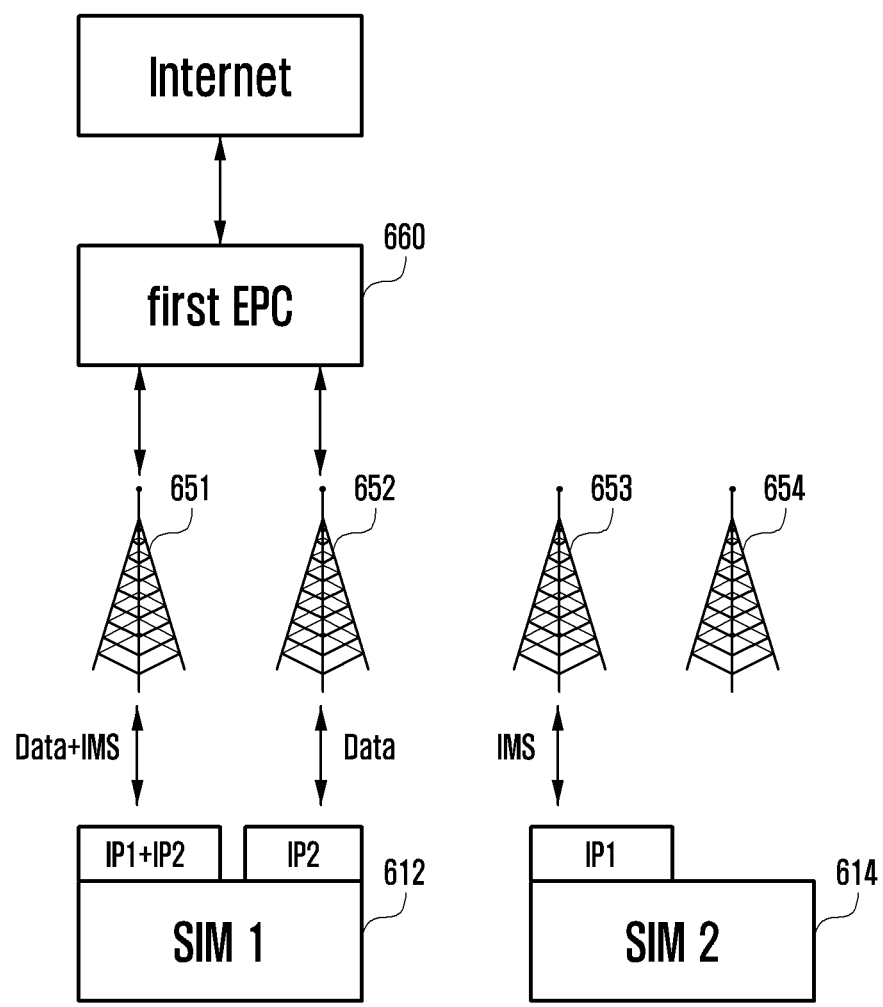
FIG. 6 is a diagram illustrating an example network access method for each SIM stack of a UE according to various embodiments.

FIG. 6 is a diagram illustrating an example network access method for each SIM stack of a UE according to various embodiments.

According to various embodiments, a UE (e.g., the UE 500 of FIG. 5) may include a first subscriber identity module (SIM) 612 and a second subscriber identity module (SIM) 614, and may perform data communication using one of them. FIG. 6 illustrates the case in which the UE accesses the Internet using the first SIM 612.

Referring to FIG. 6, the UE access a first cellular network using the first SIM 612, and may receive an IP address (IP 1) for an IMS service such as voice communication or the like, and an IP address (IP 2) for Internet data communication. The first cellular network may support EUTRA NR dual connectivity (EN-DC). The UE may perform access using only a first LTE network for the IMS, and may perform access using dual connectivity of the first LTE network and a first NR network for Internet data communication. For example, if voice communication associated with the first identify information of the first SIM 612 is received via an IMS network, voice communication may be received via a first LTE base station 651. If Internet data is received in a PDN, the UE may receive the same via the first LTE base station 651 and a first NR base station 652.

The UE may perform data communication using one of the first SIM 612 and the second SIM 614, and thus, the second SIM 614 may be connected to only the IMS. To this end, the UE may access the second cellular network using the second SIM 614, and may receive the IP address (IP 1) for the IMS service. The second cellular network may be capable of supporting an EN-DC. However, Internet data communication may not be performed in the second cellular network, and thus, the UE may not connect data communication with a second NR base station 654, and may access only a second LTE base station 653 using IP 1.

The UE may perform PDN connection with respect to an Internet PDN and/or IMS PDN in an attach procedure when initially accessing the first cellular network using the first SIM 612, and after the attach procedure, may additionally connect to the Internet PDN and/or IMS PDN, and may communicate with the first cellular network in the state of being connected to two or more PDNs. In addition, at least partially at the same time, the UE may perform PDN connection with respect to the Internet PDN and/or IMS PDN in an attach procedure when accessing the second cellular network using the second SIM 614, and after the attach procedure, may additionally connect to the Internet PDN and/or IMS PDN, and may communicate with the first cellular network in the state of being connected to two or more PDNs. Subsequently, if a SIM stack used is changed from the first SIM (SIM 1) 612 to the second SIM (SIM2) 614, the Internet PDN of the first SIM 612 may be disconnected, an NR measure request is received via the IMS PDN connection, and a bearer is changed to an SN bearer.

Although FIG. 6 illustrates the case in which the UE accesses the Internet using the first SIM 612, the UE may access the Internet using the second SIM 614. For example, in response to an activity (e.g., a user setting or the case in which communication with the second cellular network is temporarily changed to use data communication) that triggers data communication via the second cellular network, the UE may perform a process of connecting data communication with the second cellular network using second identity information of the second SIM 614.

Figure 7:
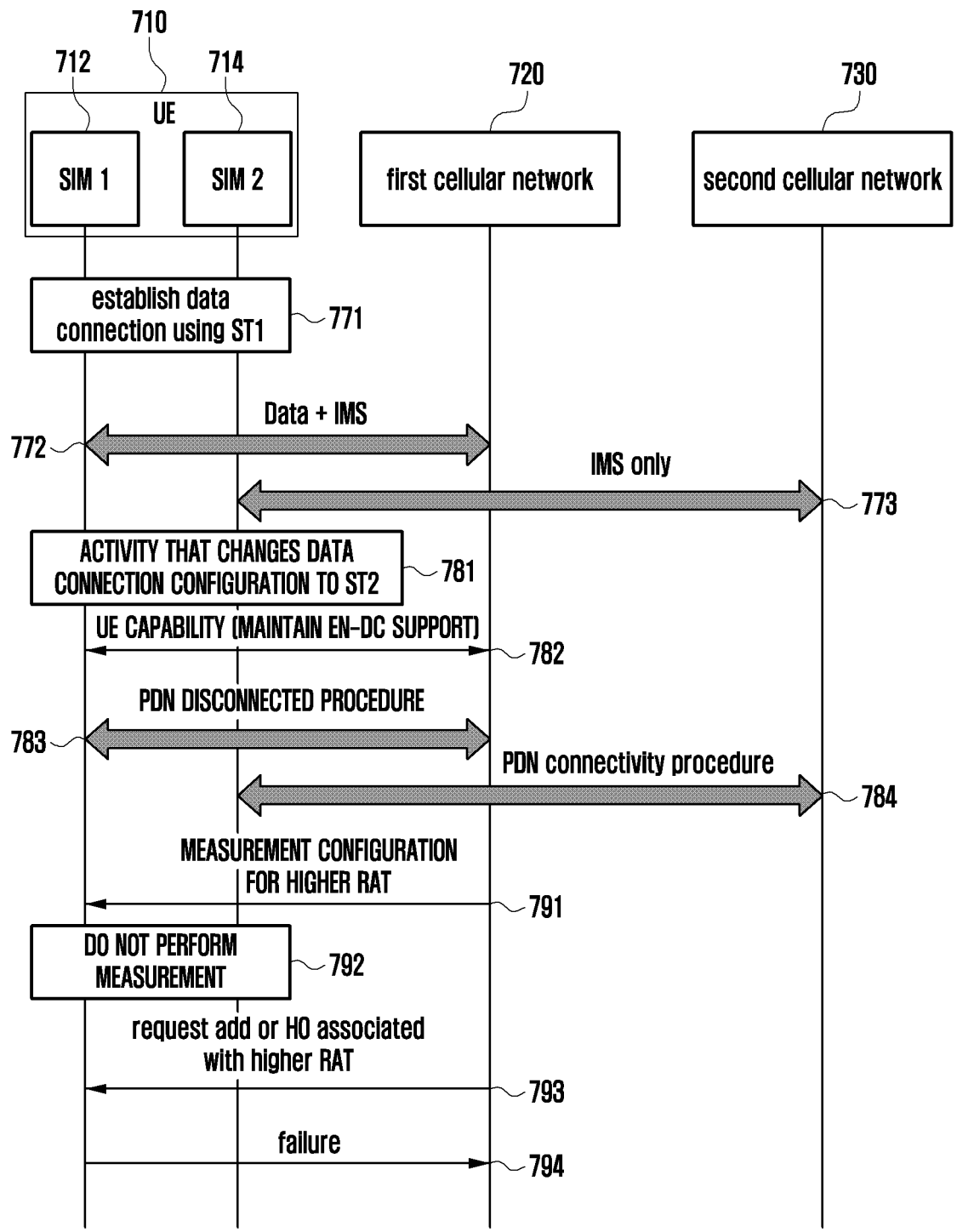
FIG. 7 is a signal flow diagram illustrating an example wireless communication process of a cellular network and a UE according to various embodiments.

FIG. 7 is a signal flow diagram illustrating a wireless communication process of a cellular network and a UE 710 according to various embodiments.

A first cellular network 720 and a second cellular network 730 may support an EN-DC.

According to various embodiments, the UE 710 may establish a data connection using a first subscriber identity module (SIM) 712 (or a communication protocol stack corresponding thereto: SIM stack 1 (ST1)) in operation 771. For example, the UE 710 may connect an EPS bearer to the first cellular network 720 via a PDN connectivity procedure for data services, and may receive an IP address for data transmission or reception.

For example, the UE 710 may attempt an initial access (initial attach) when being turned on. Immediately after being turned on, the UE 710 may be synchronized with the PLMN in an RRC idle state and may be synchronized with the first cellular network 720 after a cell search process, may transmit an attach request message, including first identity information (e.g., IMSI) of the first SIM, to an MME of the first cellular network 720, and may enter an RRC-connected state. When authentication using the first identity information is successfully performed, the MME may produce an EPS session and a default EPS bearer, may allocate an IP address to be used for data communication, and may provide the same to the UE 710.

According to various embodiments, the UE 710 may receive an IP address for an IMS service, and an IP address for Internet data communication, from the first cellular network 720. In addition, the UE 710 may receive an IP address for an IMS service from the second cellular network 720 using a second SIM 714, and Internet data communication may not be performed over the second cellular network 730. The first cellular network 720 and the second cellular network 730 may be wireless communication networks operated by different operators.

According to various embodiments, the UE 710 may perform data communication and IMS communication with the first cellular network 720 in operation 772, and may perform IMS communication with the second cellular network 730 in operation 773. The network access structure has been described with reference to FIG. 6.

According to various embodiments, the UE 710 may detect an activity (e.g., a user setting or the case in which communication with the second cellular network 730 is temporarily changed to use data communication) that triggers data communication via the second cellular network 730, or may detect an activity that triggers a data connection using the second SIM 714 or a communication protocol stack (stack 2 (ST2)) corresponding thereto in operation 781.

In this instance, even when a SIM stack to be used for data communication is changed to the second SIM, the UE 710 may maintain support of an EN-DC of a UE capability for the first cellular network 720 in operation 782. For example, although the EN-DC is not used for data communication in the first cellular network 720, the processor may maintain an RRC signaling process, or support of an EN-DC of a UE capability periodically transmitted to the first cellular network 720 (e.g., a base station of a first LTE network).

According to various embodiments, if the activity is detected, the UE 710 may perform a PDN disconnect procedure in association with an Internet data connection on the first cellular network 720 in operation 783. For example, the UE 710 may disconnect an EPS bearer which has been connected to the first cellular network 720, and may delete IP address information related thereto. In addition, the processor 710 may connect an EPS bearer to the second cellular network 730 via a PDN connectivity procedure using second identity information, and may obtain an IP address to be used for data communication in operation 784.

According to an embodiment, the UE 710 may not perform the PDN disconnect procedure 783 in association with an Internet data connection on the first cellular network 720, and may maintain a PDN connected state. In this instance, during data communication, the UE 710 may not use the IP address obtained during the Internet PDN connectivity procedure, and may not perform Internet data communication using the first SIM 712.

According to various embodiments, the UE 710 may receive a measurement configuration associated with a higher RAT (e.g., NR) from the first cellular network 720 (e.g., a first LTE base station) in operation 791. For example, the first LTE base station may transmit a measurement configuration to the UE 710 to enable the UE 710 to measure and report an NR access performance of a base station of a first NR network that is to act as a secondary node.

According to various embodiments, the UE 710 may not perform a measurement operation with respect to the base station of the first NR network even through the measurement configuration is received, in operation 792. For example, the UE 710 may not perform a series of operations, such as measuring a serving signal of the first NR network base station in a frequency band defined in the measurement configuration, and transmitting a measurement report.

According to various embodiments, a determination of cell addition of, or handover (HO) to, the first NR network of the first cellular network 720 may be received from the first cellular network 720 in operation 793. For example, if the wireless environment of a currently connected cell is poor, the first LTE base station may request addition of, or handover to, the NR cell even though event B1 is not provided as a measurement report.

According to various embodiments, the UE 710 may process the addition or handover request from the first LTE base station to be "failure", and may return "failure" in response to the request, so as not to initiate an access (attach)

process in association with the first NR network in operation 794. Accordingly, even when the first cellular network 720 supports EN-DC, and the UE capability continuously reports EN-DC support, the UE 710 may not initiate connection to the first NR base station of the first cellular network 720.

The UE according to various example embodiments may include: a first SIM corresponding to a first cellular network, a second SIM corresponding to a second cellular network, a wireless communication circuit, and the processor operatively connected to the first SIM, the second SIM, and the wireless communication circuit, wherein the processor may be configured to: control the UE to perform data communication with the first cellular network that supports EUTRA NR dual connectivity (EN-DC) using first identity information of the first SIM, via the wireless communication circuit; detect an activity that triggers data communication via the second cellular network; and in response to the detection of the activity, perform a process of connecting data communication with the second cellular network using second identity information of the second SIM via the wireless communication circuit, and maintain support of an EN-DC of a UE capability associated with the first cellular network.

According to various example embodiments, the first cellular network may include a first long term evolution (LTE) network and a first new radio (NR) network.

According to various example embodiments, the processor may be configured to not perform a measurement operation with respect to the first NR network of the first cellular network based on a measurement configuration being received from the first cellular network while the processor maintains support of the EN-DC of the UE capability associated with the first cellular network.

According to various example embodiments, the processor may be configured to return, to the first cellular network, a failure of cell addition or handover based on a determination of cell addition or handover associated with the first NR network of the first cellular network being received from the first cellular network, while the processor maintains support of the EN-DC of the UE capability associated with the first cellular network.

According to various example embodiments, the processor may be configured to maintain support of the EN-DC of the UE capability associated with the first cellular network based on the second cellular network supporting the EN-DC and including a second long term evolution (LTE) network and a second new radio (NR) network.

According to various example embodiments, the processor may be configured to identify, based on upperLayerindication-r15 of system information block (SIB) 2 received from the second cellular network, whether the second cellular network supports the EN-DC.

According to various example embodiments, the activity may be produced based on a configuration being changed, by a user setting, to perform the data communication using the second cellular network, or based on communication with the second cellular network being temporarily changed to use the data communication.

According to various example embodiments, the first cellular network and the second cellular network may be operated by different operators.

Figure 8:
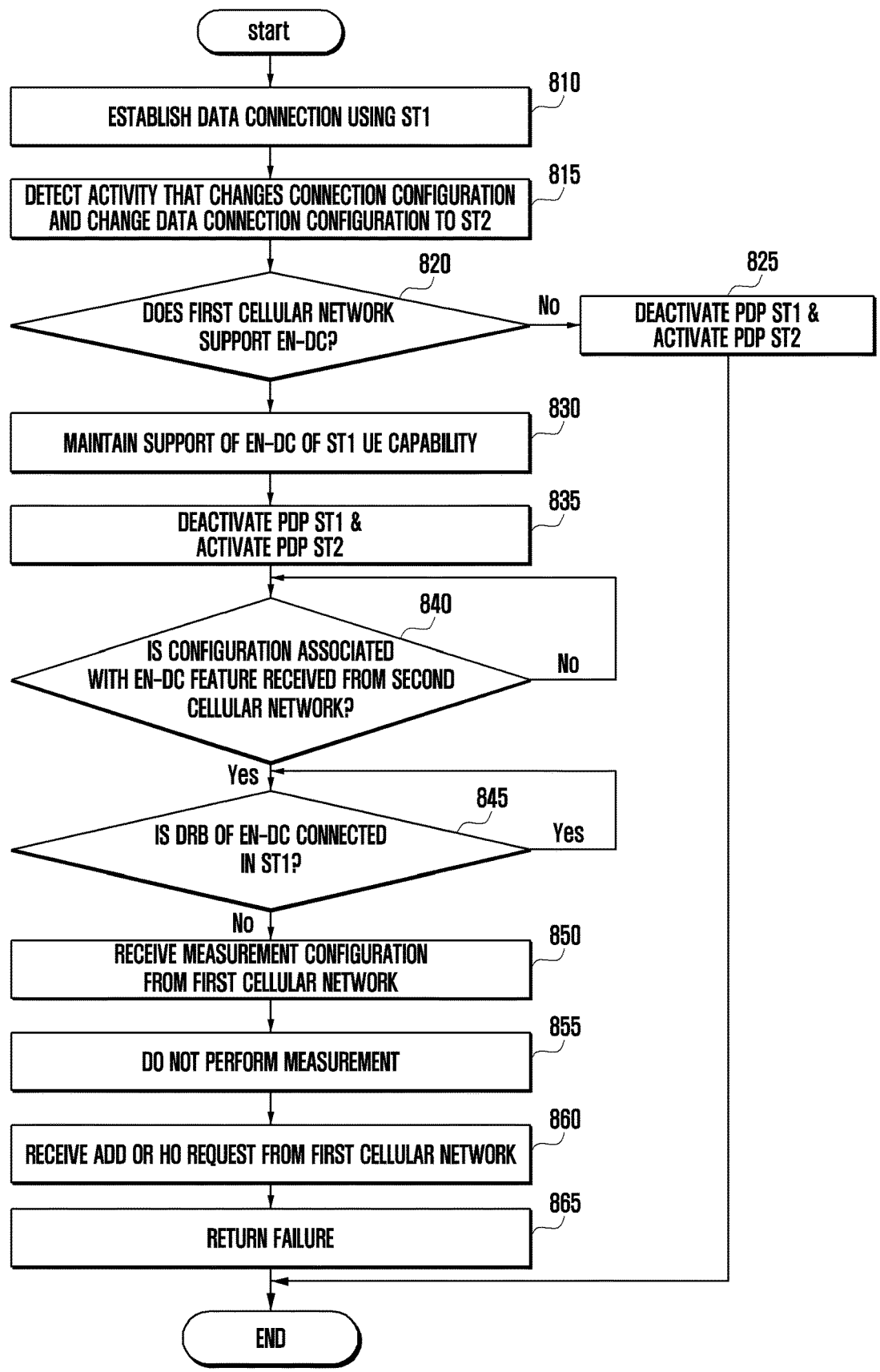
FIG. 8 is a flowchart illustrating an example method of controlling wireless communication by a UE according to various embodiments.

FIG. 8 is a flowchart illustrating an example method of controlling wireless communication by a UE according to various embodiments.

The method may be performed by a UE which has been described with reference to FIG. 5, and technical features which have been described above may not be repeated here.

In operation 810, the UE may establish a data connection using SIM stack 1 (ST1). In this instance, the UE may perform data communication and IMS communication with a first cellular network, and may perform IMS communication with a second cellular network.

The first cellular network and the second cellular network may support EUTRA NR dual connectivity (EN-DC), the first cellular network may include a first LTE network and a first NR network, and the second cellular network may include a second LTE network and a second NR network. In this instance, some cells of the first cellular network and the second cellular network may not support an EN-DC, and may cover one of LTE or NR. Accordingly, as the UE moves, the UE may access a cell that supports EN-DC, or may access a cell that supports only one of LTE or NR.

In operation 815, the UE may detect an activity that changes a data connection configuration to SIM stack 2 (ST2). For example, a user setting or the case in which the communication with the second cellular network is changed temporarily to use data communication may be an example of the activity.

In operation 820, the UE may identify whether the first cellular network supports EN-DC. Alternatively, the UE may identify whether SIM stack 1 supports a feature that uses only the resource of a higher RAT, such as EN-DC.

If the first cellular network does not support an EN-DC ("No" in operation 820), a packet data protocol (PDP) connection associated with SIM stack 1 may be deactivated, and a PDP connection associated with SIM stack 2 may be activated in operation 825. In this instance, operations after operation 830, described below, are not performed, and data communication may be performed based on SIM stack 2. According to an embodiment, the UE may not perform a deactivation process with respect to the PDP connection associated with SIM stack 1, and may maintain a PDN connected state. In this instance, during data communication, the UE may not use an IP address obtained during an Internet PDN connectivity procedure via SIM stack 1. If the first cellular network supports EN-DC, the UE may maintain support of an EN-DC of a UE capability for the first cellular network in SIM stack 1 in operation 830. For example, although the EN-DC is not used for data communication in the first cellular network, the UE may maintain an RRC signaling process, or support of an EN-DC in a UE capability periodically transmitted to the first cellular network (e.g., a base station of the first LTE network).

In operation 835, the UE may deactivate the PDP connection associated with SIM stack 1, and may activate the PDP connection associated with SIM stack 2. According to an embodiment, the UE may not perform a deactivation process with respect to the PDP connection associated with SIM stack 1, and may maintain a PDN connected state. In this instance, during data communication, the UE may not use an IP address obtained during an Internet PDN connectivity procedure via SIM stack 1.

In operation 840, the UE may identify whether a configuration associated with an EN-DC feature is received from the second cellular network (e.g., a second LTE base station). Alternatively, based on information received from the second cellular network, the UE may identify whether a serving cell that the UE accesses using SIM stack 2 supports EN-DC.

For example, based on upperLayerindication-r15 of SIB 2 received from the second cellular network (e.g., a second LTE base station), the UE may identify whether a second cellular network supports EN-DC. In this instance, if upperLayerindication-r15 of SIB 2 is true, the UE may identify that the second cellular network that the UE currently accesses supports EN-DC, and an adjacent second NR base station is present.

Alternatively, by recognizing that "restriction on user of dual connectivity with NR" transferred from a cellular network is "Use of dual connectivity with NR is not restricted" in an access (attach) process, or recognizing that NR-config-r15 information or NR-radiobearerConfig-r15 information is included in an RRC reconfiguration, the UE may identify whether the cellular network supports EN-DC. The method in which the UE identifies whether the second cellular network supports EN-DC may not be limited to the above described example, and various pieces of information described in EPS network feature support information of 3GPP 24.301 standardization specifications may be used.

In operation 845, the UE may identify whether a data radio bearer (DRB) of EN-DC is connected in SIM stack 1. For example, the UE may perform a PDN disconnect procedure with respect to an Internet data connection on the first cellular network. The UE may support an EN-DC of a UE capability although the PDN disconnection of the first cellular network is completed.

If identification of operation 845 shows that the DRB of EN-DC is not connected ("No" in operation 845), the UE may receive a measurement configuration from the first cellular network in operation 850.

In operation 855, although the measurement configuration is received, the UE may not perform a measurement operation with respect to a first NR network (e.g., a base station of the first NR network) of the first cellular network. For example, the UE may not perform a series of operations, such as measuring a serving signal of the first NR network base station in a frequency band defined in the measurement configuration, and transmitting a measurement report.

In operation 860, the UE may receive, from the first cellular network, a request for addition of a predetermined cell or handover (HO) thereto. For example, if the wireless environment of a currently connected cell is poor, addition of, or handover to, an NR cell may be requested even though event B1 is not provided as a measurement report.

In operation 865, the UE may return "failure" in response to the cell addition or handover request. For example, although an RRC connection reconfiguration request is received from a base station, the UE may transmit SCG failure information to the base station.

Accordingly, an access (attach) process may not be initiated with respect to the first NR network. Even when the first cellular network supports EN-DC, and the UE capability continuously reports EN-DC support, the UE may not initiate connection to the first NR base station of the first cellular network.

According to various example embodiments, a method performed by a UE may include: performing data communication with a first cellular network that supports EUTRA NR dual connectivity (EN-DC) using first identity information of a first subscriber identify module; detecting an activity that triggers data communication via a second cellular network; and in response to detection of the activity, performing a process of detecting data communication with the second cellular network using second identity information of a second subscriber identity module, and maintaining support of the EN-DC of a UE capability associated with the first cellular network.

According to various example embodiments, the first cellular network may include a first long term evolution (LTE) network and a first new radio (NR) network.

According to various example embodiments, the method does not perform a measurement operation with respect to the first NR network of the first cellular network based on a measurement configuration being received from the first cellular network, while maintaining support of the EN-DC of the UE capacity associated with the first cellular network.

According to various example embodiments, the method may further include returning, to the first cellular network, a failure of cell addition or handover based on a determination of cell addition or handover associated with the first NR network of the first cellular network being received from the first cellular network, while maintaining support of the EN-DC of the UE capacity associated with the first cellular network.

According to various example embodiments, the method may further include identifying whether the second cellular network supports the EN-DC and includes a second long term evolution (LTE) network and a second new radio (NR) network.

According to various example embodiments, the identifying may include identifying, based on upperLayerindication-r15 of a system information block (SIB) 2 received from the second cellular network, whether the second cellular network supports the EN-DC.

According to various example embodiments, the detecting the activity is performed based on a configuration being changed, by a user setting, to perform the data communication using the second cellular network; or based on communication with the second cellular network being temporarily changed to use the data communication.

According to various example embodiments, the first cellular network and the second cellular network may be operated by different operators.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. A user equipment (UE) comprising:
   a first subscriber identity module corresponding to a first cellular network including a first long term evolution (LTE) network and a first new radio (NR) network;
   a second subscriber identity module corresponding to a second cellular network including a first long term evolution (LTE) network and a first new radio (NR) network;
   a wireless communication circuit; and
   a processor operatively connected to the first subscriber identity module, the second subscriber identity module, and the wireless communication circuit,
   wherein the processor is configured to:
      control the wireless communication circuit to perform data communication with the first cellular network that supports EUTRA NR dual connectivity (EN-DC) using first identity information of the first subscriber identity module;
      detect an activity that triggers data communication via the second cellular network;
      in response to detecting the activity connect data communication with the second NR network of the second cellular network using second identity information of the second subscriber identity module via the wireless communication circuit, and maintain support of an EN-DC of a UE capability associated with the first cellular network, and wherein the processor is furthered configured to not perform a measurement operation with respect to the first NR network of the first cellular network based on a measurement configuration being received from the first cellular network while the processor maintains support of the EN-DC of the UE capability associated with the first cellular network.

2. The UE of claim 1, wherein the processor is further configured to return, to the first cellular network, a failure of cell addition or handover based on a determination of cell addition or handover associated with the first NR network of the first cellular network being received from the first cellular network, while the processor maintains support of the EN-DC of the UE capability associated with the first cellular network.

3. The UE of claim 1, wherein the processor is configured to maintain support of the EN-DC of the UE capability associated with the first cellular network based on the second cellular network supporting the EN-DC.

4. The UE of claim 3, wherein the processor is configured to identify, based on upperLayerindication-r15 of system information block (SIB) 2 received from the second cellular network, whether the second cellular network supports the EN-DC.

5. The UE of claim 1, wherein the activity is produced based on a configuration being changed, by a user setting, to perform the data communication using the second cellular network; or
based on communication with the second cellular network being temporarily changed to use the data communication.

6. The UE of claim 1, wherein the first cellular network and the second cellular network are operated by different operators.

7. A method performed by a user equipment (UE), comprising:
performing data communication with a first cellular network that supports EUTRA NR dual connectivity (EN-DC) using first identity information of a first subscriber identity module, wherein the first cellular network comprises a first long term evolution (LTE) network and a first new radio (NR) network;
detecting an activity that triggers data communication via a second cellular network including a second LTE network and a second NR network; and
in response to the detecting the activity, connecting data communication with the second NR network of the second cellular network using second identity information of a second subscriber identity module, and maintaining support of the EN-DC of a UE capability associated with the first cellular network,
wherein a measurement operation is not performed with respect to the first NR network of the first cellular network based on a measurement configuration being received from the first cellular network, while maintaining support of the EN-DC of the UE capacity associated with the first cellular network.

8. The method of claim 7, further comprising:
returning, to the first cellular network, a failure of cell addition or handover based on a determination of cell addition or handover associated with the first NR network of the first cellular network being received from the first cellular network, while maintaining support of the EN-DC of the UE capacity associated with the first cellular network.

9. The method of claim 7, further comprising:
identifying whether the second cellular network supports the EN-DC.

10. The method of claim 9, wherein the identifying comprises:
identifying, based on upperLayerindication-r15 of a system information block (SIB) 2 received from the second cellular network, whether the second cellular network supports the EN-DC.

11. The method of claim 7, wherein the detecting an activity is performed based on a configuration being changed, by a user setting, to perform the data communication using the second cellular network; or
based on communication with the second cellular network being temporarily changed to use the data communication.

12. The method of claim 7, wherein the first cellular network and the second cellular network are operated by different operators.

13. A user equipment (UE) comprising:
a first subscriber identity module corresponding to a first cellular network including a first long term evolution (LTE) network and a first new radio (NR) network;
a second subscriber identity module corresponding to a second cellular network including a second LTE network and a second NR network;
a wireless communication circuit; and
a processor operatively connected to the first subscriber identity module, the second subscriber identity module, and the wireless communication circuit,
wherein the processor is configured to:
control the UE to perform data communication with the first cellular network that supports EUTRA NR dual connectivity (EN-DC) using first identity information of the first subscriber identity module, via the wireless communication circuit;
detect an activity that triggers data communication via the second cellular network; and
in response to detecting the activity, connect data communication with the second NR network of the second cellular network using second identity information of the second subscriber identity module via the wireless communication circuit, and maintain support of an EN-DC of a UE capability associated with the first cellular network,
wherein the processor is further configured to return, to the first cellular network, a failure of cell addition or handover based on a determination of cell addition or handover associated with the first NR network of the first cellular network being received from the first cellular network, while the processor maintains support of the EN-DC of the UE capability associated with the first cellular network.

14. The UE of claim 13, wherein the activity is produced based on a configuration being changed, by a user setting, to perform the data communication using the second cellular network; or
based on communication with the second cellular network being temporarily changed to use the data communication.

15. The UE of claim 13, wherein the first cellular network and the second cellular network are operated by different operators.

* * * * *